(12) United States Patent
Martinez Canovas et al.

(10) Patent No.: US 11,525,055 B2
(45) Date of Patent: Dec. 13, 2022

(54) POLYCARBONATE BLENDS FOR HIGH RELEASE PERFORMANCE

(71) Applicant: SABIC GLOBAL TECHNOLOGIES B.V., Bergen Op Zoom (NL)

(72) Inventors: Maria Dolores Martinez Canovas, Murcia (ES); Mark Adrianus Johannes Van Der Mee, Breda (NL); Robert Dirk Van De Grampel, Tholen (NL); Erhard Bruss, Remagen (DE)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 991 days.

(21) Appl. No.: 16/320,778

(22) PCT Filed: Jul. 28, 2017

(86) PCT No.: PCT/IB2017/054631
§ 371 (c)(1),
(2) Date: Jan. 25, 2019

(87) PCT Pub. No.: WO2018/020482
PCT Pub. Date: Feb. 1, 2018

(65) Prior Publication Data
US 2020/0181398 A1 Jun. 11, 2020

(30) Foreign Application Priority Data
Jul. 28, 2016 (EP) .................................... 16382371

(51) Int. Cl.
*B29C 45/40* (2006.01)
*C08L 69/00* (2006.01)
(Continued)

(52) U.S. Cl.
CPC .......... *C08L 69/00* (2013.01); *B29C 45/0001* (2013.01); *B29C 45/40* (2013.01);
(Continued)

(58) Field of Classification Search
CPC .. C08L 69/00; C08L 2205/02; B29C 45/0001; B29C 45/40; B29K 2069/00
(Continued)

(56) References Cited

U.S. PATENT DOCUMENTS

| 6,166,133 A | 12/2000 | Martinez Canovas et al. |
| 10,449,344 B2 | 10/2019 | Martinez Canovas et al. |

(Continued)

FOREIGN PATENT DOCUMENTS

| WO | 2008100327 A1 | 8/2008 |
| WO | 2009017938 A1 | 2/2009 |

(Continued)

OTHER PUBLICATIONS

International Search Report and Written Opinion; International Application No. PCT/IB2017/054631, International Filing Date—Jul. 28, 2017; dated Nov. 21, 2017; 12 pages.
(Continued)

*Primary Examiner* — Jeffrey M Wollschlager
*Assistant Examiner* — Xue H Liu
(74) *Attorney, Agent, or Firm* — Cantor Colburn LLP (57) ABSTRACT

The disclosure concerns methods for molding a polycarbonate containing plastic, the method including: (a) injecting a composition into a mold, the composition including (i) about 49 wt % to about 97.9 wt % of polycarbonate, (ii) about 2.0 wt % to about 50 wt % of a polycarbonate-polysiloxane copolymer, and (iii) about 0 wt % to about 1.0 wt % of at least one release agent; and (b) releasing the composition from the mold. The mold includes at least one draft angle of about 0.1 degrees to about 7 degrees. The polycarbonate blend includes a melt flow volume rate (MVR) of at least about 25 cm3/10 min as measured according to ISO 1133 at 300° C. and 1.2 kg.

16 Claims, 4 Drawing Sheets

(51) Int. Cl.
*B29C 45/00* (2006.01)
*B29K 69/00* (2006.01)
*B29K 105/00* (2006.01)

(52) U.S. Cl.
CPC .. *B29K 2069/00* (2013.01); *B29K 2105/0005* (2013.01); *C08L 2205/02* (2013.01)

(58) Field of Classification Search
USPC .................................................. 264/328.16
See application file for complete search history.

(56) References Cited

U.S. PATENT DOCUMENTS

| | | |
|---|---|---|
| 2003/0114634 A1 | 6/2003 | Lemmon et al. |
| 2007/0010635 A1 | 1/2007 | Chen et al. |
| 2008/0004397 A1 | 1/2008 | An et al. |
| 2008/0081884 A1 | 4/2008 | Glasgow et al. |
| 2012/0129993 A1 | 5/2012 | Ha et al. |
| 2013/0203911 A1 | 8/2013 | Kulkarni et al. |
| 2013/0309474 A1 | 11/2013 | Peek et al. |
| 2014/0275368 A1 | 9/2014 | He et al. |
| 2014/0329920 A1 | 11/2014 | Rosenquist |
| 2014/0357781 A1 | 12/2014 | Yang et al. |
| 2014/0371360 A1 | 12/2014 | Zheng et al. |
| 2015/0099845 A1 | 4/2015 | Daga et al. |
| 2015/0259528 A1 | 9/2015 | Jang et al. |
| 2017/0362410 A1 | 12/2017 | Wehrmann et al. |
| 2018/0251636 A1 | 9/2018 | Abe et al. |
| 2018/0291200 A1* | 10/2018 | Takamura ............. C08L 71/123 |
| 2019/0161611 A1 | 5/2019 | Martinez Canovas et al. |
| 2019/0185664 A1 | 6/2019 | Martinez Canovas et al. |
| 2019/0225797 A1 | 7/2019 | Martinez Canovas et al. |
| 2019/0225798 A1 | 7/2019 | Martinez Canovas et al. |

FOREIGN PATENT DOCUMENTS

| | | |
|---|---|---|
| WO | 2014139110 A1 | 9/2014 |
| WO | 2014152107 A1 | 9/2014 |
| WO | 2014191973 A1 | 12/2014 |
| WO | 2015159246 A1 | 10/2015 |
| WO | 2016016850 A1 | 2/2016 |

OTHER PUBLICATIONS

International Search Report; International Application No. PCT/IB2017/054622; International Filing Date—Jul. 28, 2017; dated Oct. 10, 2017; 5 pages.
International Search Report; International Application No. PCT/IB2017/054624; International Filing Date—Jul. 28, 2017; dated Oct. 10, 2017; 5 pages.
International Search Report; International Application No. PCT/IB2017/054635; International Filing Date—Jul. 28, 2017; dated Oct. 27, 2017; 4 pages.
Japanese Pat. App. No. JP 2015-167756 (Aug. 27, 2015; unpublished priority application of US 2018/0251636 A1).
Written Opinion for International Application No. PCT/IB2017/054622; International Filing Date—Jul. 28, 2017; dated Oct. 10, 2017; 7 pages.
Written Opinion for International Application No. PCT/IB2017/054624; International Filing Date—Jul. 28, 2017; dated Oct. 10, 2017; 6 pages.
Written Opinion of the International Searching Authority; International Application No. PCT/IB2017/054635 International Filing Date—Jul. 28, 2017; dated Oct. 27, 2017. 5 pages.
International Preliminary Report on Patentability; International Application No. PCT/IB2017/054631; International Filing Date—Jul. 28, 2017; dated Feb. 7, 2019; 16 pages.
International Search Report and Written Opinion; International Application No. PCT/IB2017/054628; International Filing Date Jul. 28, 2017; dated Nov. 7, 2017; 11 pages.
Melt Mass-Flow Rate/Melt Volume-Flow Rate; Fleming Polymer Testing (2008) p. 1. (Year 2008).

* cited by examiner

FIG. 1 a) Draft Angle is increasing the part dimension

FIG. 2 b) Height max defined by release angle

FIG. 3

FIG. 4 d) Reduced by release angle

FIG. 5 e) new reduced by release angle e) new reduced by release angle

← Draft Angle

FIG. 6 f) Draft Angle which are limiting optical design surfaces ———
g) Draft Angle which are enabling new optical surfaces —–—

FIG. 7

POLYCARBONATE BLENDS FOR HIGH RELEASE PERFORMANCE

CROSS REFERENCE TO RELATED APPLICATIONS

This application is a National Stage application of PCT/IB2017/054631, filed Jul. 28, 2017, which claims the benefit of EP Application No. 16382371.9, filed Jul. 28, 2016, both of which are incorporated by reference in their entirety herein.

TECHNICAL FIELD

The disclosure concerns polycarbonate blends designed for improved gloss and release performance.

BACKGROUND

Plastic parts are always designed with a taper or draft in the direction of mold movement to allow part ejection or removal from the mold. Since plastics shrink when cooled, it is common for parts to shrink to cores. A good definition for draft would be: the degree of taper of a sidewall or rib needed to allow the molded plastic part to be removed from the metal mold. Without proper draft, plastic parts may be difficult to remove from the mold. A draft angle of more than 2 degrees to 7 degrees is regarded as standard for most polycarbonate applications. The draft increases with the de-molding complexity of the molded part.

As a result, dimensions like rib height are limited, and the wall thickness rib ratio or the overall shape in the de-molding direction is limited by the release performance of the resin. Trends in part design are driving towards parts that are thinner, more complex and have advanced styling features. In general, this requires materials that flow better to fill large and complex parts and that still have sufficient release to ensure proper de-molding of the part in general.

These and other shortcomings are addressed by aspects of the present disclosure.

SUMMARY

The disclosure concerns methods for molding a polycarbonate containing plastic, said method comprising: (a) injecting a composition into a mold, said composition comprising (i) about 50 wt % to about 98 wt % of polycarbonate; and (ii) about 2 wt % to about 50 wt % of a polycarbonate-polysiloxane copolymer; and (b) releasing said composition from said mold; wherein said mold comprises at least one draft angle of about 0.1 degrees to about 7 degrees; and wherein said polycarbonate blend comprises a melt flow volume rate (MVR) of at least about 25 cubic centimeters (cm$^3$)/10 minutes (min) as measured according to ISO 1133 at 300 degrees Celsius (° C.) and 1.2 kilograms (kg).

The disclosure also concerns methods of decreasing draft angle in a mold for producing polycarbonate products, said method comprising (a) injecting a composition into a mold, said composition comprising: (i) about 49 wt % to about 97.8 wt % of polycarbonate; (ii) about 2 wt % to about 50 wt % of a polycarbonate-polysiloxane copolymer; and (iii) about 0.1 wt % to about 1.0 wt % of at least one release agent and (b) releasing said composition from said mold; wherein said mold comprises at least one draft angle of about 0.1 degrees to about 7 degrees.

DETAILED DESCRIPTION OF ILLUSTRATIVE EMBODIMENTS

The selection of suitable draft angles is needed to allow a plastic part to be released from the mold without distortion or damage.

The high pressures of injection molding force the plastic to touch all the surfaces of a mold's cores and cavities. When calculating appropriate draft angles, the plastic material's shrinkage and physical properties, part surface structure, or in specific part—gloss level, or in specific surface—grain size must be considered.

Figure 1:
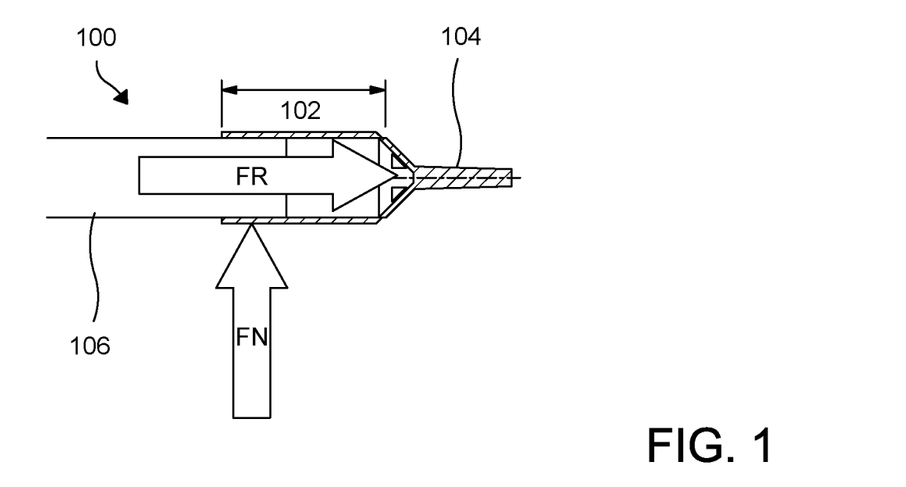
FIG. 1 shows how draft angle impacts the shape of an article.

In making plastic parts, materials are generally fed into the heated barrel of an injection molding machine, melted, and then injected under high pressure into a mold cavity. After this melt cools, a plastic component is realized. The process of cooling shrinks the melt on the mold core, necessitating an ejection force to demold the component from the mold of the machine. See, e.g., FIG. 1 showing an exemplary injection molding sleeve mold 100 comprising a sleeve 102 and sprue 104. The sleeve 102 is presented with the core 106 disposed therein. Ejection force, or mold release force (FR) for demolding from the sleeve mold may be determined.

In the ejection stage of injection molding the parts are mechanically forced to separate from the molding surfaces (especially from the cores). If the force required to remove the mold is too high (e.g., due to the strength with which the plastic sticks to the mold core), the machine's ejector pins may punch through and damage the plastic component. Ideally, the molded part should slip down easily from the mold core. The friction coefficient refers to the sticking or adhesive force that exists between the plastic part and the metal surface of the mold. Reduce this force, and demolding will be more efficient. Friction is normally understood as the resistance offered by bodies in contact to relative motion. In injection molding the bodies in contact are steel molding surfaces and polymer moldings.

Aesthetics and functionality of products may require the use of small draft angles. Small draft angles, however, lead to an increase of the ejection forces.

It is known that very good polished, mirror-like surfaces can be difficult to separate by the local formation of vacuum. The testing of demolding, particularly for those developing raw materials, has focused on speeding up cycle times and reducing the amount of release agents used in the thermoplastic. The typical percentage of a release agent in the melt is 1% or about 1.0%, or even 0.5% or about 0.5%. If this amount of release agent can be reduced to 0.2% or about 0.2%, a reduction of problems observed in the molding process that relate to high contents of release agents can be avoided, such as mold deposit on the tools requiring frequent tool cleaning and loss of productivity.

In polymer injection molding, adhesion force(s) between part and the tool are a complex interaction due to the dependency of part geometry and process parameters such as temperature and pressure. Ejection force, also called release force, has been identified in literature as a total friction between the tool and the polymer interface.

Holding pressure and surface temperature may influence the ejection force.

Friction between the thermoplastic part and the injection mold core not only depends on the mechanical relationship between the two surfaces, but also on an adhesive component inherent in the properties of the two materials at processing conditions.

While the deformation (or mechanical) component of friction tends to be more easily defined, the adhesion component is rather more complex.

For polymers, the surface forces consist of van der Waals, coulombic and possibly hydrogen bonding forces. The higher the surface free energy of the polymer, the greater the adhesive force.

Equations developed for the ejection force for deep injection molded parts derive from the friction-based concept $FR=Cf \times pA \times A$, where FR is the ejection (or mold release) force, Cf is the coefficient of friction between the mold and the part, pA is the contact pressure of the part against the mold core, and A is the area of contact.

Contact pressure can be defined as $p=E(T) \times \Delta dr \times sm$, and therefore ejection force is: $FR=Cf \times E(T) \; \Delta dr \times sm \times 2\pi L$, where E(T) is the modulus of the thermoplastic part material at ejection temperature, $\Delta dr$ is the relative change in diameter of the part immediately after ejection, sm, is the thickness of the part, and L is the length of the part in contact with the mold core.

Statistical analyses for demolding forces are used to determine the effects of packing time, cooling time and packing pressure on ejection force for materials or grade combinations. One common analysis as described above is to injection mold a sleeve and then measure the ejection force necessary to remove the sleeve from the core. At the opening of the mold, the part remains on the core due to the material contraction. At the end of the opening stroke, the ejector pins detach the part from the core. The force applied to the part for demolding is registered as the Mold Release Force (FR). Referring again to FIG. 1, a mold 100 comprising a sleeve 102 and sprue 104 suitable for use in determining ejection force is shown. The sleeve 102 is presented with the core 106 disposed therein. Ejection force, or mold release force (FR), for demolding may be determined according to the equation:

$$FR=Cf \cdot FN$$

where Cf is the coefficient of friction between the sleeve and the core while FN refers to the normal force applied on the core due to shrinkage.

The friction properties of pairs of materials are usually represented by the coefficient of friction. The coefficient of friction is defined (e.g., in ASTM G40 test standard) as: $\mu$=F/N In which, F is friction force and N is normal contact force. The same standard defines a coefficient of static friction ($\mu$s) corresponding to the maximum force that must be overcome to initiate macroscopic motion between the two bodies. A coefficient of kinetic friction is obtained from the average friction force necessary to maintain the macroscopic relative motion between the two bodies. It is represented by $\mu$k.

Figure 2:
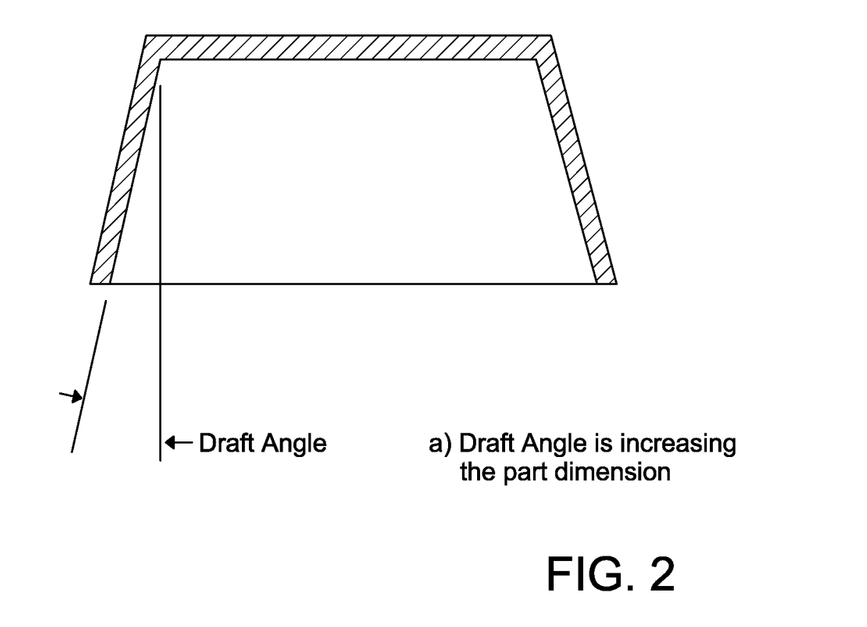
FIG. 2 shows how forces create the need for draft angles.
Figure 3:
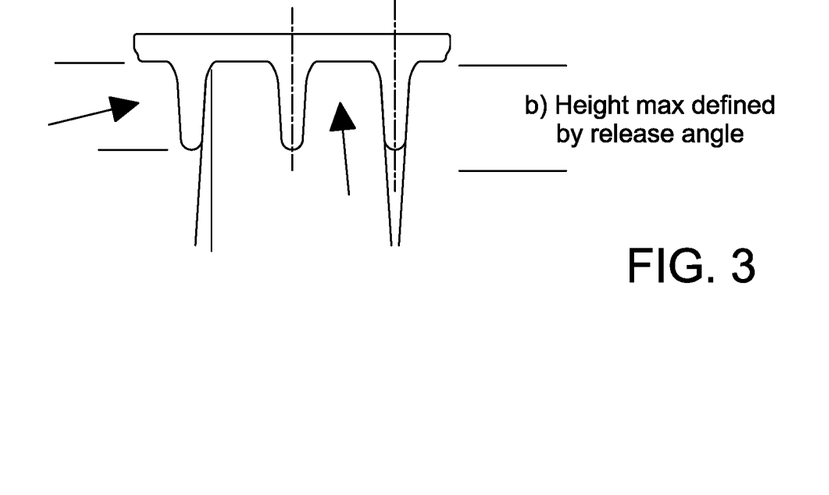
FIG. 3 shows that maximum height of a mold section is controlled by release angle.

The plastic tends to stick over the surface of the cores. For example, the sidewalls that are perpendicular to the mold's parting line must be drafted (a). Draft angles increase the shape dimensions. See, e.g., FIG. 2. Other areas that require draft angles include mounting flanges, gussets, holes, hollow bosses, louvers other holes or ribs. As a result, dimensions like rib height are limited, and the wall thickness rib ratio is correlated to the draft angle. The plastic design rules define the shape of: a hole, a core, the rib height, the height of a side wall or the wall thickness rib ratio. See, e.g., FIG. 3.

A high gloss surface may need more draft than rough surfaces. For example, currently automotive bezels include a variety of materials, depending on the part design and the heat requirements, including polycarbonate (PC), Polybutylene terephthalate (PBT), high heat PC, polyethersulfones and polyetherimide. Amongst polycarbonates, typical market solutions for bezels include use of PC having a melt flow volume rate (MVR) of about 8 up to about 35 cubic centimeters per 10 minutes ($cm^3/10$) min as tested according to ISO 1133. Such polycarbonates are available from Covestro and SABIC. PC resins with an MVR of greater than about 35 $cm^3/10$ min are not currently used for complex shapes because the low Mw results in brittleness and consequently to de-molding failures or in-use part failures.

Mold drafts facilitate part removal from the mold. The draft is generally in an offset angle that is parallel to the mold opening and closing. The ideal draft angle for a given part depends on the depth of the part in the mold and its required end-use function. The mold part line will need to be located in a way that splits the draft in order to minimize it. If no draft is acceptable due to design/styling considerations, a side action mold (side slider) may be required in some aspects.

As a result, designers typically design parts according to the general plastic rules to ensure good manufacturing performance and aesthetics of the part.

In the instant disclosure, molded parts may include draft angles of 0.1 degrees to 7 degrees, or about 0.1 degrees to about 7 degrees. In some aspects molded parts include draft angles that are less than 5 degrees or less than 3 degrees or less than 1.5 degrees or less than 1 degree.

Polycarbonate Polymer

The terms "polycarbonate" or "polycarbonates" as used herein include copolycarbonates, homopolycarbonates, (co) polyester carbonates and combinations thereof.

The term polycarbonate can be further defined as compositions have repeating structural units of the formula (1):

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, in particular, a radical of the formula (2):

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. Polycarbonate materials include materials disclosed and described in U.S. Pat. No. 7,786, 246, which is hereby incorporated by reference in its entirety for the specific purpose of disclosing various polycarbonate compositions and methods for manufacture of same. Polycarbonate polymers can be manufactured by means known to those skilled in the art.

Some polycarbonates are linear bisphenol-A polycarbonates produced by melt polymerization. The melt polycarbonate process is based on continuous reaction of a dihydroxy compound and a carbonate source in a molten stage. The reaction can occur in a series of reactors where the combined effect of catalyst, temperature, vacuum, and agitation allows for monomer reaction and removal of reaction by-products to displace the reaction equilibrium and effect polymer chain growth. A common polycarbonate made in melt polymerization reactions is derived from bisphenol A (BPA) via reaction with diphenyl carbonate (DPC). This reaction can be catalyzed by, for example, tetra methyl ammonium hydroxide (TMAOH) or tetrabutyl phosphonium acetate (TBPA), which can be added in to a monomer mixture prior to being introduced to a first polymerization unit and sodium hydroxide (NaOH), which can be added to the first reactor or upstream of the first reactor and after a monomer mixer.

The polycarbonates may be linear bisphenol-A polycarbonates produced by melt polymerization. The melt polycarbonate process is based on continuous reaction of a dihydroxy compound and a carbonate source in a molten stage. The reaction can occur in a series of reactors where the combined effect of catalyst, temperature, vacuum, and agitation allows for monomer reaction and removal of reaction by-products to displace the reaction equilibrium and effect polymer chain growth. A common polycarbonate made in melt polymerization reactions is derived from bisphenol A (BPA) via reaction with diphenyl carbonate (DPC). This reaction can be catalyzed by, for example, tetra methyl ammonium hydroxide (TMAOH) or tetrabutyl phosphonium acetate (TBPA), which can be added in to a monomer mixture prior to being introduced to a first polymerization unit and sodium hydroxide (NaOH), which can be added to the first reactor or upstream of the first reactor and after a monomer mixer.

The melt polycarbonate in some aspects may have a molecular weight (Mw) of 15,000 Dalton to 120,000 Dalton or about 15,000 to about 120,000 Dalton on a polystyrene basis The melt polycarbonate product may have an endcap level of 45% to 80% or about 45% to about 80%. Some polycarbonates have an endcap level of 45% to 75% or about 45% to about 75%, 55% to 75% or about 55% to about 75%, 60% to 70% or about 60% to about 70%, or 60% to 65% or about 60% to about 65%. Certain polycarbonates have at least 200 parts per million (ppm) of hydroxide groups. Certain polycarbonates have 200 ppm to 1100 ppm or about 200 ppm to about 1100 ppm, or 950 ppm to 1050 ppm or about 950 ppm to about 1050 ppm hydroxide groups.

The polycarbonate polymer may contain endcapping agents. Any suitable endcapping agents can be used provided that such agents do not significantly adversely impact the desired properties of the polycarbonate composition (transparency, for example). Endcapping agents include mono-phenolic compounds, mono-carboxylic acid chlorides, and/or mono-chloroformates. Mono-phenolic endcapping agents are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol.

Additionally, some polycarbonates include from 200 ppm to 2000 ppm or about 200 ppm to about 2000 ppm, or from 250 ppm to 1800 ppm or about 250 to about 1800 ppm Fries products. Fries products include ester type of structures A, B, and C.

Apart from the main polymerization reaction in polycarbonate production, there is a series of side reactions consisting of chain rearrangements of the polymer backbone that lead to branching that are often referred to as Fries rearrangement. The Fries species specifically found in bisphenol A melt polycarbonates include the ester type of structures A, B, and C.

A. Linear Fries:

B. Branched Fries:

C. Acid Fries:

The Fries reaction is induced by the combined effect of basic catalysts, temperature, and residence time, which generally result in melt-produced polycarbonates being branched as compared with the interfacial polycarbonates since their manufacturing temperatures are lower. Because high branching levels in the resin can have a negative effect on the mechanical properties of the polycarbonate (for example, on impact strength), a product with lower branched Fries product may be desirable.

In some aspects the polycarbonate polymer is a linear bisphenol-A polycarbonate produced by a melt polymerization process. In other aspects the polycarbonate polymer is a linear bisphenol-A polycarbonate produced by an interfacial polymerization process.

In some compositions, the polycarbonate polymer comprises at least one polycarbonate polymer having a molecular weight (Mw) of at least 20,000 g/mol and a second polycarbonate polymer have a molecular weight (Mw) of less than 20,000 g/mol. In some compositions, the molar ratio of said first polycarbonate polymer to said second polycarbonate polymer is 1.4:1 to 3.2:1 or about 1.4:1 to about 3.2:1. In other compositions, the molar ratio of said first polycarbonate polymer to said second polycarbonate polymer is 1.5:1 to 3.0:1 or about 1.5:1 to about 3.0:1.

In certain aspects, polycarbonate produced by interfacial polymerization may be utilized. In some processes, bisphenol A and phosgene are reacted in an interfacial polymerization process. Typically, the disodium salt of bisphenol A is dissolved in water and reacted with phosgene which is typically dissolved in a solvent that not miscible with water (such as a chlorinated organic solvent like methylene chloride).

In some aspects, the polycarbonate comprises interfacial polycarbonate having a weight average molecular weight of from 10,000 Daltons to 50,000 Daltons or about 10,000 Daltons to about 50,000 Daltons, preferably about 15,000 to about 45,000 Daltons. Some interfacial polycarbonates have and endcap level of at least 90% or preferably 95%.

Polycarbonate-Polysiloxane Copolymer

As used herein, the term "polycarbonate-polysiloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. In some aspects, the polysiloxane-polycarbonate copolymer comprises polydiorganosiloxane blocks comprising structural units of the general formula (3) below:

wherein the polydiorganosiloxane block length (E) is from about 10 to about 200, preferably about 20 to about 100, more preferably about 30 to about 50; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (4) below:

wherein at least 60 percent of the total number of $R^1$ groups comprise aromatic moieties and the balance thereof comprise aliphatic, alicyclic, or aromatic moieties.

Certain polycarbonate-polysiloxane resins comprise allylphenol capped siloxanes. Such resins comprise the structure of the general formula (5) below:

(5)

where R is an alkyl group having 1-3 carbon atoms, n1 is an integer of from 2 to 4 and n2 is an integer of from 1 to 200. Polycarbonate-polysiloxane copolymers comprising such structures can be found in European Patent Application No. 1757634 which is hereby incorporated by reference in its entirety for the specific purpose of disclosing various compositions and methods for manufacture of same.

Certain polysiloxane-polycarbonates materials include materials disclosed and described in U.S. Pat. No. 7,786,246, which is hereby incorporated by reference in its entirety for the specific purpose of disclosing various compositions and methods for manufacture of same.

The polycarbonate-siloxane copolymer comprises about 10 to about 40 wt % siloxane. In particular aspects, the polycarbonate-siloxane copolymer comprises about 15 to about 25 wt % siloxane. Certain polycarbonate-polysiloxane copolymers have a polydiorganosiloxane block having from about 20 to about 60 diorganosiloxane units. In some aspects, the polycarbonate-polysiloxane copolymer has a siloxane content of about 10 wt % to about 40 wt % based on the total weight of the polycarbonate-polysiloxane, in an amount effective to provide a total siloxane content of 0.5 wt % to 10 wt % based on the total weight of the blended composition.

In some aspects the polycarbonate in the polycarbonate-siloxane copolymer is a linear bisphenol-A polycarbonate produced by a melt polymerization process. In other aspects the polycarbonate in the polycarbonate-siloxane copolymer is a linear bisphenol-A polycarbonate produced by an interfacial polymerization process.

Release Agent

Examples of mold release agents include both aliphatic and aromatic carboxylic acids and their alkyl esters, for example, stearic acid, behenic acid, pentaerythritol stearate, glycerin tristearate, and ethylene glycol distearate. Polyolefins such as high-density polyethylene, linear low-density polyethylene, low-density polyethylene, and similar polyolefin homopolymers and copolymers can also be used a mold release agents.

Some compositions use pentaerythritol stearate, glycerol monostearate, a wax or a poly-alpha-olefin.

Use of a mold release agent is often used to improve release of an article from the mold. Mold release agents are typically present in the composition at 0.1 to 1 wt % or about 0.1 to about 1 wt %, based on total weight of the composition, and in particular aspects from 0.1 to 0.7 wt % or about 0.1 to about 0.7 wt %, from 0.1 to 0.5 wt. % or about 0.1 to about 0.5 wt %, or from 0.1 to 0.4 wt % or about 0.1 to about 0.4 wt %. Particular aspects have less than 0.3 wt %, or even less than 0.2 wt % release agent. In certain aspects, the mold release agent is present in the compositions in an amount of from 0.1 wt % to about 1 wt %.

In some aspects the mold release agents will have high molecular weight, typically greater than 300, to prevent loss of the release agent from the molten polymer mixture during melt processing.

Additional Components

The additive composition can include an impact modifier, flow modifier, antioxidant, heat stabilizer, light stabilizer, ultraviolet (UV) light stabilizer, UV absorbing additive, plasticizer, lubricant, antistatic agent, anti-fog agent, antimicrobial agent, colorant (e.g., a dye or pigment), surface effect additive, radiation stabilizer, anti-drip agent (e.g., a PTFE-encapsulated styrene-acrylonitrile copolymer (TSAN)), or a combination comprising one or more of the foregoing. For example, a combination of a heat stabilizer and ultraviolet light stabilizer can be used. In general, the additives are used in the amounts generally known to be effective. For example, the total amount of the additive composition can be from 0.001 wt % to 10.0 wt % or about 0.001 to about 10.0 wt %, or from 0.01 to 5 wt % or about 0.01 to about 5 wt %, each based on the total weight of all ingredients in the composition.

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition.

Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like. Some suitable impact modifies include PC(polycarbonate)/ABS (such as Cycoloy PC/ABS) and MBS type formulations.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of from about 0.01 to about 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), polyethylene, waxes (e.g., beeswax, montan wax, paraffin wax, or the like), or combinations comprising at least one of the foregoing plasticizers, lubricants, and mold release agents. These are generally used in amounts of from about 0.01 to about 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of from about 0.01 to about 1 wt %, specifically, from about 0.1 to about 0.5 wt %, and more specifically, from about 0.15 to about 0.4 wt %, based upon the total weight of polymer in the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of from 0.01 to 0.1 parts by weight or about 0.01 to about 0.1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Antidrip agents can be used in amounts of about 0.1 to about 10 parts by weight, based on 100 parts by weight of the total composition, excluding any filler.

The polycarbonate compositions may optionally include flame retardants. Various types of flame retardants can be utilized. In one aspect, the flame retardant additives include, for example, flame retardant salts such as alkali metal salts of perfluorinated C1-C16 alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein.

The polycarbonate compositions can optionally include a colorant composition containing pigment and/or dye additives. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

The composition can have any suitable color including white, gray, light gray, black, and the like. The white or light gray color can exhibit an L* value greater than or equal to 80. A composition having a white or light gray color can comprise an amount of titanium dioxide in amounts of 0.1 to 30 wt % or about 0.1 to about 30 wt %, 0.1 to 25 wt % or about 0.1 to about 25 wt %, 0.1 to 20 wt % or about 0.1 to about 20 wt %, or 0.1 to 15 wt % or about 0.1 to about 15 wt %, each based on the total weight of the polycarbonate composition.

The gray or black color can exhibit an L* value of below 80. A composition having a gray or black color can comprise an amount of carbon black of greater than zero and less than 1.5 wt % based on the total weight of the colorant composition. In an aspect, a molded sample having a thickness of 1 mm and comprising the composition has an average L* value of 29 or less as measure by the CIE Lab method, 10 degree observer, D65 illuminant, specular component included, measured in reflectance mode.

Polymer Mixtures

The polymer compositions can be formed by techniques known to those skilled in the art. Extrusion and mixing techniques, for example, may be utilized to combine the components of the polymer composition.

The polymer composition may comprise (i) about 50 wt % to about 98 wt % of polycarbonate; and (ii) about 2 wt % to about 50 wt % of a polycarbonate-polysiloxane copolymer. Certain compositions comprise (i) about 49 wt % to about 97.9 wt % of polycarbonate; (ii) about 2.0 wt % to about 50 wt % of a polycarbonate-polysiloxane copolymer; and (iii) about 0.1 wt % to about 1.0 wt % of at least one release agent. Some compositions comprise (i) about 69 wt % to about 97.9 wt % of polycarbonate, (ii) about 2.0 wt % to about 30 wt % of a polycarbonate-polysiloxane copolymer, and about 0.1 wt % to about 1.0 wt % of at least one release agent. Certain polymer compositions comprise: about (i) 74.7 wt % to about 97.4 wt % polycarbonate; (ii) about 2.5 wt % to about 25 wt % polycarbonate-polysiloxane copolymer; and (iii) about 0.1 wt % to about 0.3 wt % release agent. In further examples, the polymer composition may comprise (i) 50 wt % to 98 wt % of polycarbonate; and (ii) 2 wt % to 50 wt % of a polycarbonate-polysiloxane copolymer. Certain compositions comprise (i) 49 wt % to 97.9 wt % of polycarbonate; (ii) 2.0 wt % to 50 wt % of a polycarbonate-polysiloxane copolymer; and (iii) 0.1 wt % to 1.0 wt % of at least one release agent. Some compositions comprise (i) 69 wt % to 97.9 wt % of polycarbonate, (ii) 2.0 wt % to 30 wt % of a polycarbonate-polysiloxane copolymer, and 0.1 wt % to 1.0 wt % of at least one release agent. Certain polymer compositions comprise (i) 74.7 wt % to 97.4 wt % polycarbonate; (ii) 2.5 wt % to 25 wt % polycarbonate-polysiloxane copolymer; and (iii) 0.1 wt % to 0.3 wt % release agent.

The polymer mixtures of the instant disclosure may have a melt flow volume rate (MVR) of at least 30 $cm^3/10$ min or at least 25 $cm^3/10$ min when measured according to ISO 1133 at 300° C. and 1.2 kg.

In some aspects, the composition has a siloxane content of 0.5 to 4 wt % or about 0.5 to about 4 wt % based on the total composition. In other aspects, the composition has a siloxane content of 1 to 2 wt % or about 1 to 2 wt % based on the total composition.

Molds

Molds for forming molded articles are well known to those skilled in the art and can be formed from conventional materials. In some aspects, the mold has at least one draft angle of from 0.1 degrees to 7 degrees or about 0.1 degrees to about 7 degrees. Some molds have at least one draft angle of from 0.1 degree to 3 degrees or about 0.1 degree to about 3 degrees. Other molds have at least one draft angle of from 0.1 degree to 2.5 degree or about 0.1 degree to about 2.5 degrees.

In some aspects, the disclosure concerns heating a composition and feeding the heated composition into a heated barrel of an injection molding machine and allowing the composition to melt. The melted composition can then be injected at elevated pressure into a mold cavity. Once the composition solidifies (either by passive or active cooling) forming a molded composition, the molded composition may be ejected from the mold. In some aspects, a demolding force of less than 400 Newton (N), or less than 350 N, or less than 300 N, or even less than 250 N is required to remove the molded composition from the mold.

Figure 4:
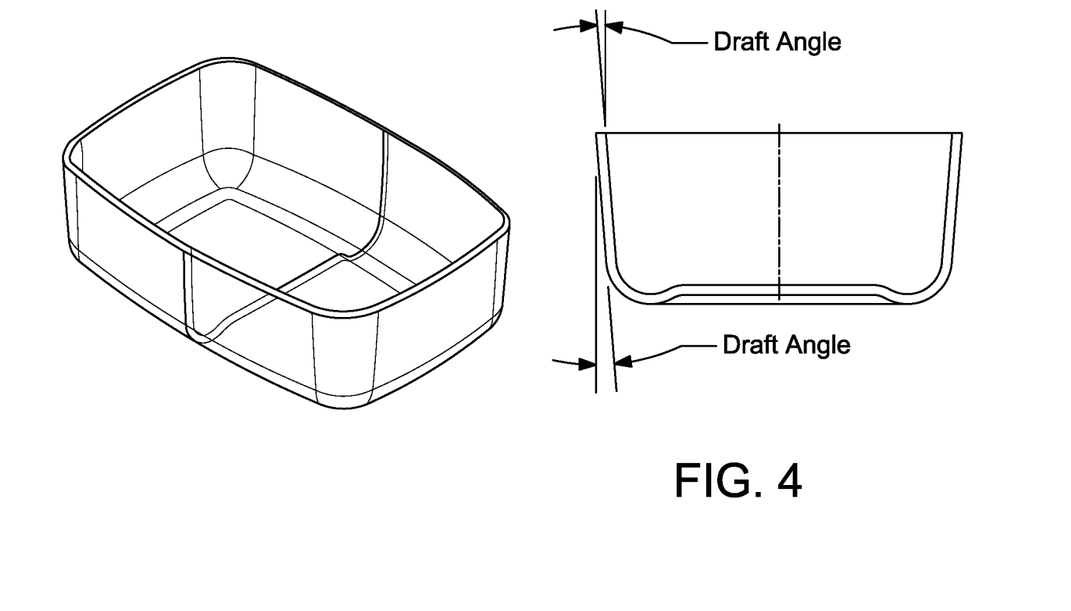
FIG. 4 shows applications for bezels, reflectors housings or box shapes which require high aesthetic gloss surfaces—parts which can normally only be molded by applying strictly the plastic design rules (f) as in FIG. 7.
Figure 5:
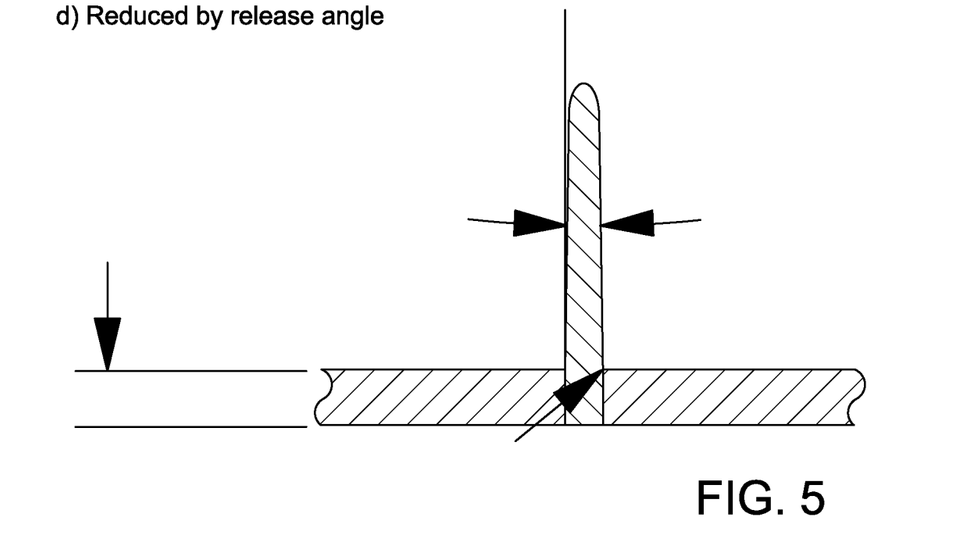
FIGS. 5 and 6 illustrate box, reflector, housing or bezel designs with lower draft angles (e) and larger ribs (d) that can be used with the compositions according to aspects of the disclosure due to more rectangular walls with minimum release angle.
Figure 6:
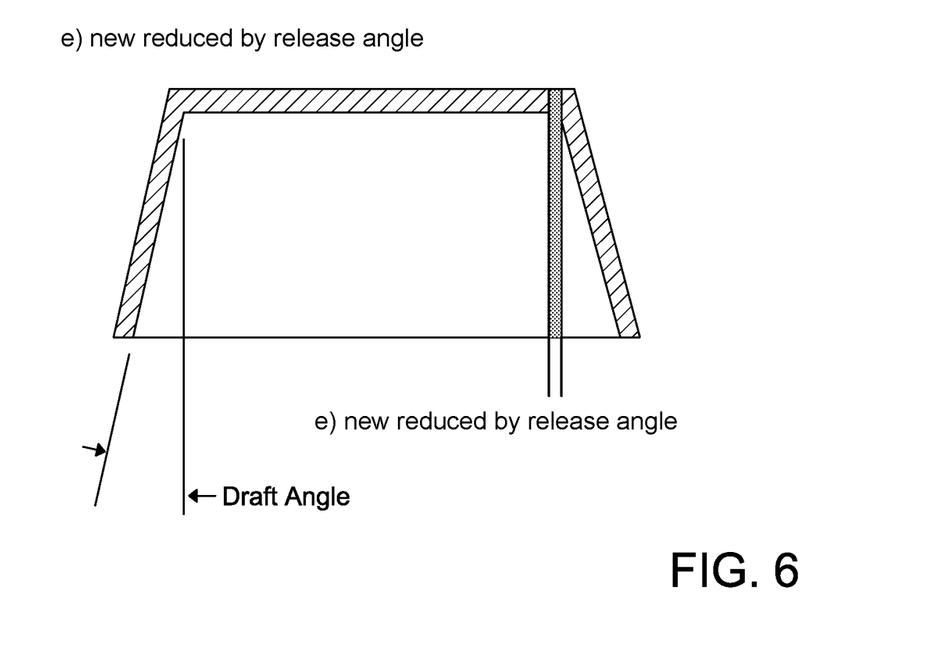
Figure 7:
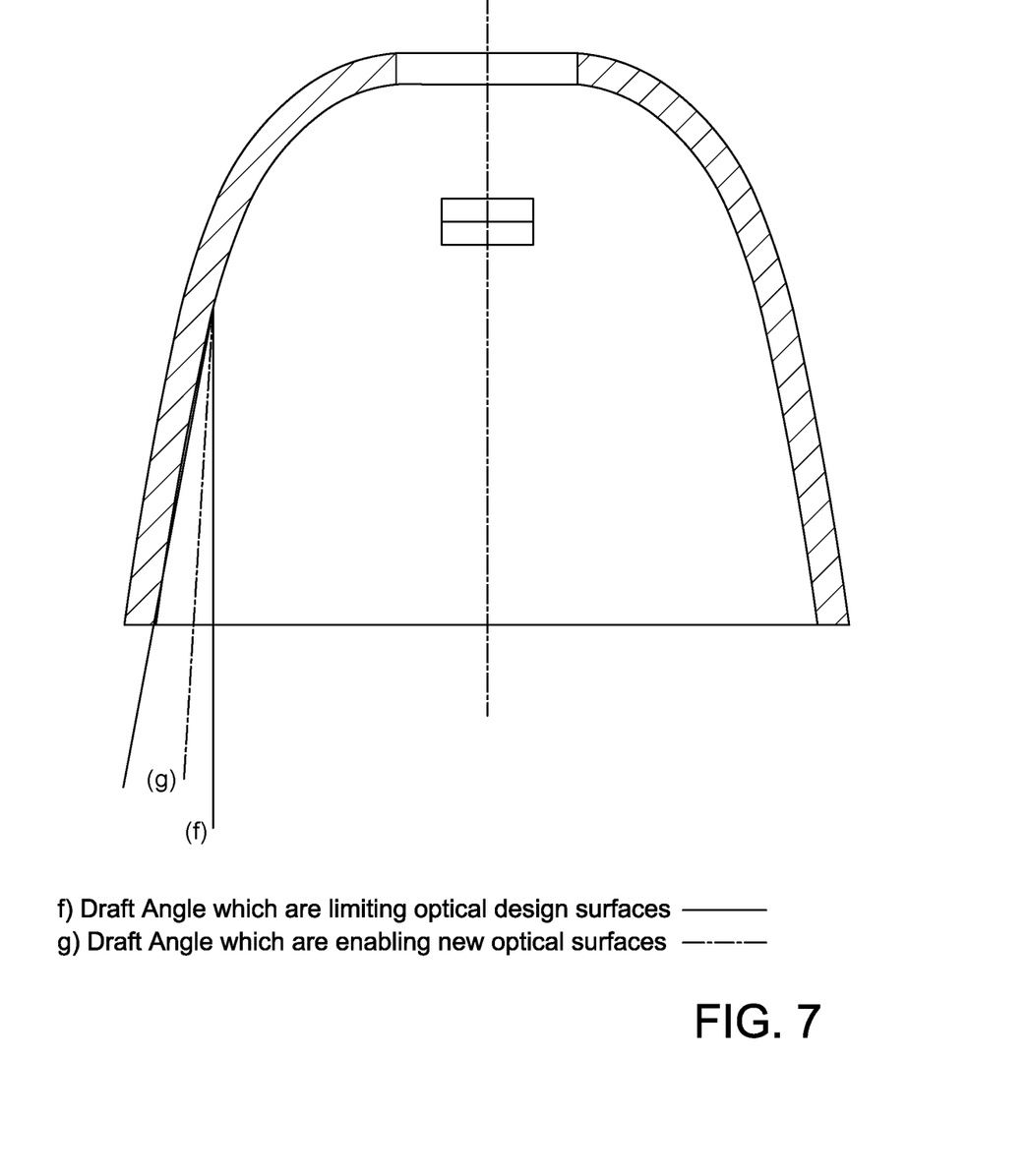
FIG. 7 illustrates how increased draft angle increases part dimension.

As illustrated in FIG. 4, molded articles according to aspects of the present disclosure allow reduced draft (g, as shown in FIG. 7), enabling new shapes, lower part volumes or improved optical surface areas. As further illustrated in FIGS. 5 and 6, molded articles according to aspects of the present disclosure have high flow and improved release characteristic that enable box designs with lower draft angles (e) (FIG. 6) and larger ribs (d) (FIG. 5) due to more rectangular walls with minimum release angle.

Definitions

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. When more than one range for a particular value is disclosed, the ranges are combinable to form additional aspects.

As used herein, the terms "about" and "at or about" mean that the amount or value in question can be the designated value, approximately the designated value, or about the same as the designated value. It is generally understood, as used herein, that it is the nominal value indicated ±5% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "weight %," and "wt %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

As used herein, the terms "weight average molecular weight" or "Mw" can be used interchangeably, and are defined by the formula:

$$M_w = \frac{\sum N_i M_i^2}{\sum N_i M_i},$$

where Mi is the molecular weight of a chain and Ni is the number of chains of that molecular weight. Mw can be determined for polymers, e.g. polycarbonate polymers, by methods well known to a person having ordinary skill in the art using molecular weight standards, e.g. polycarbonate standards or polystyrene standards, and in particular certified or traceable molecular weight standards. Polystyrene basis refers to measurements using a polystyrene standard.

The term "siloxane" refers to a segment having a Si—O—Si linkage.

The term "flowable" means capable of flowing or being flowed. Typically a polymer is heated such that it is in a melted state to become flowable.

"Interfacial polycarbonate" is produced by a process where typically the disodium salt of bisphenol A (BPA) is dissolved in water and reacted with phosgene which is typically dissolved in a solvent that not miscible with water.

"Melt polycarbonate" is produced by a process where BPA reacts with diphenyl carbonate (DPC) in a molten state without the solvent.

Melt flow Volume Rate (MVR) is measured according to ISO 1133 at 300° C. and 1.2 kg.

Ejection force may be measured by injection molding sleeves in a core and then measuring the force necessary to remove the sleeve from the core. For example, ejection force of a molded article comprising the polycarbonate blend may be evaluated by injection molding a sleeve in a core and determining the force necessary to remove the sleeve from the core. At the opening of the mold, the sleeve remains on the core due to the material contraction. At the end of the opening stroke, the ejector pins detach the sleeve from the core. The force applied to the sleeve for demolding is measured as the mold release force. The surface temperature of the sleeve is kept constant so that an accurate comparison of ejection forces can be made. Referring again to FIG. 1, a mold 100 comprising a sleeve 102 and sprue 104 suitable for use in determining ejection force is shown. The sleeve 102 is presented with the core 106 disposed therein. Ejection force, or mold release force (FR), for demolding may be determined according to equation (1) above.

"Draft angle" concerns the slope of the wall of a mold as depicted in FIG. 7 showing a conventional draft angle (f) and reduced draft angle (g) according to aspects of the present disclosure.

Aspects

The present disclosure comprises at least the following aspects.

Aspect 1. A method of molding a polycarbonate containing plastic, the method comprising: (a) injecting a composition into a mold, the composition comprising: about 50 wt % to about 98 wt % of polycarbonate; about 2 wt % to about 50 wt % of a polycarbonate-polysiloxane copolymer; (b) releasing the composition from the mold; wherein the mold comprises at least one draft angle of about 0.1 degrees to about 7 degrees; and wherein the polycarbonate blend comprises a melt flow volume rate (MVR) of at least about 25 cm³/10 min as measured according to ISO 1133 at 300° C. and 1.2 kg.

Aspect 2. A method of molding a polycarbonate containing plastic, the method comprising: (a) injecting a composition into a mold, the composition consisting essentially of: about 50 wt % to about 98 wt % of polycarbonate; about 2 wt % to about 50 wt % of a polycarbonate-polysiloxane copolymer; (b) releasing the composition from the mold; wherein the mold comprises at least one draft angle of about 0.1 degrees to about 7 degrees; and wherein the polycarbonate blend comprises a melt flow volume rate (MVR) of at least about 25 cm³/10 min as measured according to ISO 1133 at 300° C. and 1.2 kg.

Aspect 3. A method of molding a polycarbonate containing plastic, the method comprising: (a) injecting a composition into a mold, the composition consisting of: about 50 wt % to about 98 wt % of polycarbonate; about 2 wt % to about 50 wt % of a polycarbonate-polysiloxane copolymer; (b) releasing the composition from the mold; wherein the mold comprises at least one draft angle of about 0.1 degrees to about 7 degrees; and wherein the polycarbonate blend comprises a melt flow volume rate (MVR) of at least about 25 cm³/10 min as measured according to ISO 1133 at 300° C. and 1.2 kg.

Aspect 4. A method of molding a polycarbonate containing plastic, the method comprising: (a) injecting a composition into a mold, the composition comprising: 50 wt % to 98 wt % of polycarbonate; 2 wt % to 50 wt % of a polycarbonate-polysiloxane copolymer; (b) releasing the composition from the mold; wherein the mold comprises at least one draft angle of 0.1 degrees to 7 degrees; and wherein the polycarbonate blend comprises a melt flow volume rate (MVR) of at least 25 cm³/10 min as measured according to ISO 1133 at 300° C. and 1.2 kg.

Aspect 5. The method of any one of Aspects 1-4, additionally comprising about 0.1 wt % to about 1.0 wt % of at least one release agent.

Aspect 6. The method of any one of Aspects 1-4, additionally comprising 0.1 wt % to 1.0 wt % of at least one release agent.

Aspect 7. The method of any one of Aspects 1-6, wherein the draft angle is about 0.1 degree to about 3 degrees.

Aspect 8. The method of any one of Aspects 1-6, wherein the draft angle is 0.1 degree to 3 degrees.

Aspect 9. The method of any one of Aspects 1-8, wherein the polycarbonate polymer comprising at least one polycarbonate polymer having a molecular weight (Mw) of at least 20,000 g/mol and a second polycarbonate polymer have a molecular weight (Mw) of less than 20,000 g/mol.

Aspect 10. The method of any one of Aspects 1-9, wherein the composition comprises: about 74.7 wt % to about 97.4 wt % polycarbonate; about 2.5 wt % to about 25 wt % polycarbonate-polysiloxane copolymer; and about 0.1 wt % to about 0.3 wt % release agent.

Aspect 11. The method of any one of Aspects 1-9, wherein the composition comprises: 74.7 wt % to 97.4 wt % polycarbonate; 2.5 wt % to 25 wt % polycarbonate-polysiloxane copolymer; and 0.1 wt % to 0.3 wt % release agent.

Aspect 12. The method of any one of Aspects 1-11, wherein the composition has a siloxane content of about 0.5 to about 4 wt %.

Aspect 13. The method of any one of Aspects 1-11, wherein the composition has a siloxane content of 0.5 to 4 wt %.

Aspect 14. The method of any one of Aspects 1-13, wherein the composition has a siloxane content of about 1 to about 2 wt %.

Aspect 15. The method of any one of Aspects 1-13, wherein the composition has a siloxane content of 1 to 2 wt %.

Aspect 16. The method of any one of Aspects 1-15, wherein the polycarbonate-polysiloxane copolymer has a siloxane content of about 4 to about 25 wt %.

Aspect 17. The method of any one of Aspects 1-15, wherein the polycarbonate-polysiloxane copolymer has a siloxane content of 4 to 25 wt %.

Aspect 18. The method of any one of Aspects 1-17, wherein the polycarbonate-polysiloxane copolymer comprises a polydiorganosiloxane block having from about 20 to about 60 diorganosiloxane units.

Aspect 19. The method of any one of Aspects 1-17, wherein the polycarbonate-polysiloxane copolymer comprises a polydiorganosiloxane block having from 20 to 60 diorganosiloxane units.

Aspect 20. The method of any one of Aspects 1-19, additionally comprising an antioxidant composition.

Aspect 21. The method of any one of Aspects 1-20, wherein the release agent is present in an amount of about 0.2 wt % or less.

Aspect 22. The method of any one of Aspects 1-20, wherein the release agent is present in an amount of 0.2 wt % or less.

Aspect 23. The method of any one of claims 9-22, wherein the molar ratio of the first polycarbonate polymer to the second polycarbonate polymer is about 1.4:1 to about 3.2:1.

Aspect 24. The method of any one of claims 9-22, wherein the molar ratio of the first polycarbonate polymer to the second polycarbonate polymer is 1.4:1 to 3.2:1.

Aspect 25. The method of any one of Aspects 1-24, wherein the molar ratio of the first polycarbonate polymer to the second polycarbonate polymer is about 1.5:1 to about 3.0:1.

Aspect 26. The method of any one of Aspects 1-24, wherein the molar ratio of the first polycarbonate polymer to the second polycarbonate polymer is 1.5:1 to 3.0:1.

Aspect 27. The method of any one of Aspects 1-26, wherein the composition is cooled after being injected into the mold and prior to being released from the mold.

Aspect 28. The method of any one of Aspects 1-27, wherein: the composition is fed into a heated barrel of an injection molding machine, the composition is allowed to melt, the composition is injected at elevated pressure into a mold cavity, and the composition is allowed to cool in the mold to form a mold cavity to form the molded composition.

Aspect 29. The method of any one of claims 1-28, wherein the polycarbonate has a melt flow volume rate (MVR) above 30 cm³/10 min as measured according to ISO 1133 at 300° C. and 1.2 kg.

Aspect 30. The method of any one of Aspects 1-29, wherein the composition has a coefficient of friction of less than 20 as determined by UL 410.

Aspect 31. The method of method of Aspect 30, wherein a demolding force of less than 400 N is required to remove the molded composition from the mold.

Aspect 32. The method of any one of claims 9-31, wherein the first polycarbonate polymer has a molecular weight (Mw) of 20,000 g/mol to about 23,000 g/mol.

Aspect 33. The method of any one of claims 9-31, wherein the first polycarbonate polymer has a molecular weight (Mw) of 20,000 g/mol to 23,000 g/mol.

Aspect 34. The method of any one of Aspects 9-32, wherein the second polycarbonate polymer has a molecular weight (Mw) of about 18,000 g/mol to about 19,500 g/mol.

Aspect 35. The method of any one of Aspects 9-32, wherein the second polycarbonate polymer has a molecular weight (Mw) of 18,000 g/mol to 19,500 g/mol.

Aspect 36. The method of any one of Aspects 1-35, wherein the mold is designed to produce a bezel, frame, housing, reflector, mobile phone housing or cup.

Aspect 37. The method of any one of Aspects 1-36, wherein the polycarbonate-polysiloxane copolymer has a siloxane content of 10 wt % to 40 wt % based on the total weight of the polycarbonate-polysiloxane, in an amount effective to provide a total siloxane content of 0.5 wt % to 10 wt % based on the total weight of the composition.

Aspect 38. The method of any one of Aspects 1-37, wherein the polycarbonate-polysiloxane copolymer has a siloxane content of about 10 wt % to about 40 wt % based on the total weight of the polycarbonate-polysiloxane, in an amount effective to provide a total siloxane content of about 0.5 wt % to about 10 wt % based on the total weight of the composition.

Aspect 39. The polycarbonate blend or molded article of any one of Aspects 1-38, wherein the blend has a Fries number of 200 ppm or higher or 400 ppm or higher or 600 ppm or higher or 800 ppm or higher based on the total composition.

Aspect 40. A method of decreasing draft angle in a mold for producing polycarbonate products, the method comprising: (a) injecting a composition into a mold, the composition comprising: about 50 wt % to about 98 wt % of polycarbonate; and about 2 wt % to about 50 wt % of a polycarbonate-polysiloxane copolymer; (b) releasing the composition from the mold; wherein the mold comprises at least one draft angle of about 0.1 degrees to about 7 degrees.

Aspect 41. A method of decreasing draft angle in a mold for producing polycarbonate products, the method comprising: (a) injecting a composition into a mold, the composition comprising: 50 wt % to 98 wt % of polycarbonate; and 2 wt % to 50 wt % of a polycarbonate-polysiloxane copolymer; (b) releasing the composition from the mold; wherein the mold comprises at least one draft angle of about 0.1 degrees to about 7 degrees.

Aspect 42. A method of decreasing draft angle in a mold for producing polycarbonate products, the method consisting of: (a) injecting a composition into a mold, the composition comprising: about 50 wt % to about 98 wt % of polycarbonate; and about 2 wt % to about 50 wt % of a polycarbonate-polysiloxane copolymer; (b) releasing the composition from the mold; wherein the mold comprises at least one draft angle of about 0.1 degrees to about 7 degrees.

Aspect 43. A method of decreasing draft angle in a mold for producing polycarbonate products, the method consisting of: (a) injecting a composition into a mold, the composition consisting essentially of: about 50 wt % to about 98 wt % of polycarbonate; and about 2 wt % to about 50 wt % of a polycarbonate-polysiloxane copolymer; (b) releasing the composition from the mold; wherein the mold comprises at least one draft angle of about 0.1 degrees to about 7 degrees.

Aspect 44. The method of Aspect 25, additionally comprising 0.1 wt % to about 1.0 wt % of at least one release agent.

Aspect 45. The method of Aspect 25 or Aspect 26, wherein the draft angle is about 0.1 degrees to about 3 degrees.

Aspect 46. The method of any one of Aspects 25-27, wherein the composition comprises: about 74.7 wt % to about 97.4 wt % polycarbonate; about 2.5 wt % to about 25 wt % polycarbonate-polysiloxane copolymer; and about 0.1 wt % to about 0.3 wt % release agent.

Aspect 47. The method of any one of Aspects 24-27, wherein the composition has a siloxane content of about 1 to about 2 wt %.

EXAMPLES

The following non-limited examples illustrate certain aspects of the disclosure.

The ingredients utilized in the examples are shown in Table 1:

TABLE 1

| | |
|---|---|
| PC1 | Linear Bisphenol A Polycarbonate homopolymer, produced via interfacial polymerization, Mw of about 18,800 grams/mole (g/mol) as determined by gel permeation chromatography (GPC) using polycarbonate standards, para-cumylphenol (PCP) end-capped |
| PC2 | Linear Bisphenol A Polycarbonate homopolymer, produced via interfacial polymerization, Mw of about 21,800 g/mol as determined by GPC using polycarbonate standards, para-cumylphenol (PCP) end-capped |
| PC3 | Branched Bisphenol A Polycarbonate homopolymer, produced via melt polymerization, Mw of about 18,000 g/mol as determined by GPC using polycarbonates standards, BPA/Phenol end-capped. Fries level of 250-350 ppm. |
| PC4 | Branched Bisphenol A Polycarbonate homopolymer, produced via melt polymerization, Mw of about 20,600 g/mol as determined by GPC using polycarbonates standards, BPA/Phenol end-capped, Fries level of <400 ppm. |
| PC5 | Linear Bisphenol A Polycarbonate homopolymer, produced via interfacial polymerization, Mw of about 29,000 g/mol as determined by GPC using polycarbonate standards, phenol end-capped |
| PC6 | Branched Bisphenol A Polycarbonate homopolymer, produced via melt polymerization, Mw of about 29,000 g/mol as determined by GPC using polycarbonates standards, BPA/Phenol end-capped. Fries level of 900-1100 ppm. |
| PC-Si1 | PDMS (polydimethylsiloxane) - Bisphenol A Polycarbonate copolymer, produced via interfacial polymerization, 20 wt % siloxane, average PDMS D block length of 45 units (D45), Mw about 30,000 g/mol as determined by GPC using polycarbonate standards, para-cumylphenol (PCP) end-capped |
| PETS | PETS - Pentaerythritol tetrastearate, >90% esterified |
| GTS | Octadecanoic acid, 1,2,3-propanetriyl ester (glycerol tristearate) |
| AD1 | Tris(2,4-di-tert-butylphenyl)phosphite (Irgafos ® 168) |
| AD2 | Carbon black |

TABLE 2

| Component | CE1 | CE2 | CE3 | E4 | E5 | E6 |
|---|---|---|---|---|---|---|
| PC3 | 5 | 5 | 5 | 35.09 | 35.09 | 34.89 |
| PC4 | 94.79 | 94.49 | 94.59 | 55 | 55 | 55 |
| PC-Si | 0 | 0 | 0 | 9.5 | 9.5 | 9.5 |
| PETS | 0 | 0.3 | — | 0.25 | — | 0.3 |
| GTS | 0 | — | 0.2 | — | 0.2 | 0.1 |
| AD1 | 0.06 | 0.06 | 0.06 | 0.06 | 0.06 | 0.06 |
| AD2 | 0.15 | 0.15 | 0.15 | 0.15 | 0.15 | 0.15 |
| % Siloxane | 0 | 0 | 0 | 1.9 | 1.9 | 1.9 |
| MVR | 30 | 31 | 30 | 31 | 31 | 31 |
| Coefficient of Friction | 49 | 28 | 35 | 15 | 13 | 15 |
| Ejection force | 646 | 435 | 506 | 316 | 312 | 281 |

As demonstrated by the data in Table 2:
1. The coefficient of friction and ejection force are very high for pure melt polycarbonate with MVR of 30 with values around 50 and 650 respectively (CE1).

2. The coefficient of friction and ejection force are improved when release agents are added to melt polycarbonate with MVR of 30, such as PETS (CE2) and GTS (CE3), but values are still relatively high with coefficient of friction of 28 (CE2) and 35 (CE3), and ejection force of 435 (CE2) and 506 (CE3).
3. The addition of PC-Si to compositions containing melt polycarbonate and release agent (PETS, GTS or PETS and GTS, E4, E5 and E6 respectively) results in significantly lower coefficient of friction and ejection force compared to similar compositions with PC-Si (CE2 and CE3) is similar for polycarbonate compositions with 0.3% release agent (PETS). Values for coefficient of friction of 15 and lower are achieved for E4-6 compared to values above 25 for CE2 and CE3, and values for ejection force of 320 and lower are achieved for E4-5 compared to values above 430 for CE2 and CE3.

This demonstrates that compositions containing PC, Si—PC and release (PETS and/or GTS) have a unique performance in having high flow, with MVR above 30, and good release performance, far outperforming similar compositions without PC-Si, having coefficient of friction below 20 and ejection force below 400, which cannot be achieved by the comparative examples. As such, these compositions are more suitable for molds with relatively sharp draft angles.

TABLE 3

|  | CE7 | CE8 | E9 | E10 | E11 | E12 | E13 |
|---|---|---|---|---|---|---|---|
| PC1 | 25 | 30 | 28 | 28 | 30 | 30 | 35 |
| PC2 | 74.79 | 65.29 | 64.89 | 64.79 | 62.99 | 62.79 | 55.04 |
| PC-Si | 0 | 4.5 | 6.5 | 6.5 | 6.5 | 6.5 | 9.5 |
| PETS | 0 | 0 | 0.4 | 0.5 |  |  | 0.25 |
| GTS | 0 | 0 |  |  | 0.3 | 0.5 |  |
| AD1 | 0.06 | 0.06 | 0.06 | 0.06 | 0.06 | 0.06 | 0.06 |
| AD2 | 0.15 | 0.15 | 0.15 | 0.15 | 0.15 | 0.15 | 0.15 |
| % Siloxane | 0 | 1.3 | 1.3 | 1.3 | 1.3 | 1.3 | 1.9 |
| MVR | 30 | 30 | 31 | 29 | 32 | 28 | 29 |
| Coefficient of Friction | 62 | 20 | 17 | 13 | 16 | 10 | 16 |
| Ejection force | 631 | 565 | 351 | 261 | 350 | 275 | 332 |

TABLE 4

|  | E14 | E15 | E16 | E17 | E18 |
|---|---|---|---|---|---|
| PC1 | 35 | 35 | 30 | 30 | 30 |
| PC2 | 55.09 | 54.89 | 57.19 | 56.79 | 57.19 |
| PC-Si | 9.5 | 9.5 | 12.5 | 12.5 | 12.5 |
| PETS | — | 0.3 | 0.1 | 0.5 | — |
| GTS | 0.2 | 0.1 | — | — | 0.1 |
| AD1 | 0.06 | 0.06 | 0.06 | 0.06 | 0.06 |
| AD2 | 0.15 | 0.15 | 0.15 | 0.15 | 0.15 |
| % Siloxane | 1.9 | 1.9 | 2.5 | 2.5 | 2.5 |
| MVR | 29 | 30 | 26 | 25 | 26 |
| Coefficient of Friction | 15 | 16 | 15 | 12 | 14 |
| Ejection force | 330 | 292 | 329 | 242 | 341 |

TABLE 5

|  | E19 | E20 |
|---|---|---|
| PC1 | 30 | 30 |
| PC2 | 56.99 | 56.79 |
| PC-Si | 12.5 | 12.5 |
| PETS | — | — |
| GTS | 0.3 | 0.5 |
| AD1 | 0.06 | 0.06 |
| AD2 | 0.15 | 0.15 |
| % Siloxane | 2.5 | 2.5 |
| MVR | 27 | 26 |
| Coefficient of Friction | 12 | 9 |
| Ejection force | 291 | 235 |

As demonstrated by the data in Tables 3-5:
1. The coefficient of friction and ejection force are very high for pure interfacial polycarbonate with MVR of 29 with values around 60 and 630 respectively (CE7).
2. The coefficient of friction and ejection force are improved when PC-Si is added to interfacial polycarbonate (CE8), though the coefficient of friction of 20 and especially the ejection force of 565 are still relatively high.
3. When using the combination of PC-Si and release agent selected from PETS, GTS or their combination (E9-E20), a significantly improved release performance is obtained with coefficient of friction typically below 20 and ejection force below 350, compared to significantly higher values for CE7 and CE8.
4. Coefficient of friction and ejection force can be optimized via increasing the release content and/or the PC-Si content, which allows coefficient of friction values below 15 or even below 10 and ejection force below 300 or even 250.

This demonstrates that compositions containing PC, Si—PC and release (PETS and/or GTS) have a unique performance in having high flow, with MVR above 25, and good release performance, far outperforming similar compositions without PC-Si or release, having coefficient of friction below 20, more preferred below 15 or even 10, and ejection force below 400, more preferred below 300 or even 250, which cannot be achieved by the comparative examples. As such, these compositions are more suitable for molds with relatively sharp draft angles.

Additional formulations are presented in Tables 6A and 6B. The samples include varying amounts of the PC-Si 1 component with varying polycarbonate compositions and ratios.

TABLE 6A

| Comp. | CE21 | CE22 | E23 | CE24 | CE25 | CE26 | E27 | E28 |
|---|---|---|---|---|---|---|---|---|
| PC1 | — | 25 | — | 30 | — | 30 | — | 30. |
| PC2 | — | 74.59 | — | 68.34 | — | 67.09 | — | 64.59 |
| PC3 | 5 | — | 30 | — | 30 | — | 30 | — |
| PC4 | 94.59 | — | 68.34 | — | 67.09 | — | 64.59 | — |
| PC5 | — | — | — | — | — | — | — | — |
| PC6 | — | — | — | — | — | — | — | — |
| PETS | 0.2 | 0.2 | 0.2 | 0.2 | 0.2 | 0.2 | 0.2 | 0.2 |
| PC-DMS opaque | — | — | 1.25 | 1.25 | 2.5 | 2.5 | 5 | 5 |
| IRG | 0.06 | 0.06 | 0.06 | 0.06 | 0.06 | 0.06 | 0.06 | 0.06 |
| CB | 0.15 | 0.15 | 0.15 | 0.15 | 0.15 | 0.15 | 0.15 | 0.15 |
| Ejection force (N) | 689 | 758 | 641 | 722 | 681 | 732 | 592 | 698 |
| MVR (300° C., 1.2 kg) | 26 | 32 | 31 | 33 | 31 | 30 | 28 | 29 |
| INI at 3 mm, 23° C. | 10.25 | 52.51 | 14.27 | 52.61 | 15.89 | 52.52 | 46.13 | 53.42 |
| INI at 3 mm, 0° C. | 9.48 | 10.87 | 10.25 | 16.8 | 12.77 | 18.36 | 14.9 | 37.08 |
| INI at 3 mm, −30° C. | 8.02 | 8.57 | 8.18 | 9.14 | 9.61 | 10.44 | 10.23 | 12.9 |

TABLE 6B

| Comp. | E29 | CE30 | E31 | CE32 | CE33 | CE34 | E35 | E36 |
|---|---|---|---|---|---|---|---|---|
| PC1 | — | 35 | — | 40 | — | — | 16 | — |
| PC2 | — | 57.09 | — | 47.09 | — | — | 8.836 | 18.836 |
| PC3 | 35 | — | 40 | — | — | 47.09 | 24 | — |
| PC4 | 57.09 | — | 47.09 | — | 47.09 | — | 28.254 | 28.254 |
| PC5 | — | — | — | — | — | 40 | — | 16 |
| PC6 | — | — | — | — | 40 | — | — | 24 |
| PETS | 0.2 | 0.2 | 0.2 | 0.2 | 0.2 | 0.2 | 0.2 | 0.2 |
| PC-DMS opaque | 7.5 | 7.5 | 12.5 | 12.5 | 12.5 | 12.5 | 12.5 | 12.5 |
| IRG | 0.06 | 0.06 | 0.06 | 0.06 | 0.06 | 0.06 | 0.06 | 0.06 |
| CB | 0.15 | 0.15 | 0.15 | 0.15 | 0.15 | 0.15 | 0.15 | 0.15 |
| Ejection force (N) | 520 | 636 | 451 | 526 | 596 | 604 | 470 | 541 |
| MVR (300° C., 1.2 kg) | 27 | 29 | 25 | 26 | 10 | 10 | 24 | 10 |
| INI at 3 mm, 23° C. | 52.85 | 53.15 | 53.54 | 54.8 | 67.05 | 67.99 | 55.07 | 64.04 |
| INI at 3 mm, 0° C. | 18.96 | 47.21 | 47.02 | 50.22 | 62.58 | 64.61 | 10.9 | 61.76 |
| INI at 3 mm, −30° C. | 12.56 | 15.26 | 16.05 | 21.74 | 39.42 | 51.98 | 19.85 | 22.99 |

As demonstrated by the data:
1. The ejection force appears lower for polycarbonate compositions prepared with the melt polycarbonate.
2. The ejection force is lowest for polycarbonate composition having melt polycarbonate components at less than 400 ppm fries content (E30), even if interfacial polycarbonate is also present (E34).
3. The data continues the trend of lower ejection force compositions containing polycarbonate and Si-PC1 have significantly lower ejection force in various compositions when the polycarbonate is made by melt polymerization process compared to the same composition based on polycarbonate made by an interfacial process.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A method of forming a molded polycarbonate composition, the method comprising:
   injecting a composition into a mold to form the molded polycarbonate composition, the composition comprising:
     about 50 wt % to about 98 wt % of polycarbonate, based on the total weight of the composition; and
     about 2.0 wt % to about 50 wt % of a polycarbonate-polysiloxane copolymer, based on the total weight of the composition; and
   releasing the molded polycarbonate composition from the mold;
   wherein the mold comprises at least one draft angle of about 0.1 degrees to about 7 degrees; and
   wherein the composition comprises a melt flow volume rate of at least about 25 cm$^3$/10 min as measured according to ISO 1133 at 300° C. and 1.2 kg;
   wherein the composition has a Fries number of about 200 ppm or higher based on the total composition.

2. The method of claim 1, wherein the composition further comprises about 0.1 wt % to about 1.0 wt % of at least one mold release agent, based on the total weight of the composition.

3. The method of claim 1, wherein the at least one draft angle is about 0.1 degrees to about 3 degrees.

4. The method of claim 1, wherein the polycarbonate comprises a first polycarbonate having a weight average molecular weight of at least 20,000 g/mol and a second polycarbonate having a weight average molecular weight of less than 20,000 g/mol, as determined by gel permeation chromatography using polycarbonate standards.

5. The method of claim 1, wherein the composition comprises:
about 74.7 wt % to about 97.4 wt % of the polycarbonate;
about 2.5 wt % to about 25 wt % of the polycarbonate-polysiloxane copolymer; and
further comprises about 0.1 wt % to about 0.3 wt % of a mold release agent, wherein all amounts are based on the total weight of the composition.

6. The method of claim 1, wherein the composition has a siloxane content of about 0.5 wt % to about 4 wt %, based on the total weight of the composition.

7. The method of claim 6, wherein the siloxane content is about 1 wt % to about 2 wt %, based on the total weight of the composition.

8. The method of claim 1, wherein the polycarbonate-polysiloxane copolymer has a siloxane content of about 4 wt % to about 25 wt %, based on the weight of the polycarbonate-polysiloxane copolymer.

9. The method of claim 4, wherein a molar ratio of the first polycarbonate to the second polycarbonate is about 1.4:1 to about 3.2:1.

10. The method of claim 1, wherein the injecting further comprises:
feeding the composition into a heated barrel of an injection molding machine;
melting the composition in the injection molding machine to form a melted composition;
injecting the melted composition into a mold cavity; and
cooling the melted composition in the mold cavity to form the molded polycarbonate composition.

11. The method of claim 1, wherein the polycarbonate has a melt flow volume rate of greater than about 30 $cm^3$/10 min, as measured according to ISO 1133 at 300° C. and 1.2 kg.

12. The method of claim 1, wherein the composition has a coefficient of friction of less than about 20 as determined by UL 410.

13. The method of claim 1, further comprising removing the molded polycarbonate composition from the mold, wherein a demolding force is less than about 400 N.

14. The method of claim 1, wherein the polycarbonate comprises a first polycarbonate having a weight average molecular weight of 20,000 g/mol to about 23,000 g/mol and a second polycarbonate having a weight average molecular weight of about 18,000 g/mol to about 19,500 g/mol, as determined by gel permeation chromatography using polycarbonate standards.

15. The method of claim 1, wherein the mold is configured to produce a bezel, frame, housing, reflector, mobile phone housing or cup.

16. A molded polycarbonate composition formed by the method of claim 1, the composition comprising:
50 wt % to 98 wt % of polycarbonate; and
2.0 wt % to 50 wt % of a polycarbonate-polysiloxane copolymer;
wherein the composition comprises a melt flow volume rate (MVR) of at least 25 $cm^3$/10 min, as measured according to ISO 1133 at 300° C. and 1.2 kg,
wherein the composition has a Fries number of 200 ppm or higher based on the total composition;
wherein the polycarbonate comprises a first polycarbonate having a weight average molecular weight of 20,000 g/mol to about 23,000 g/mol and a second polycarbonate having a weight average molecular weight of about 18,000 g/mol to about 18,500 g/mol, as determined by gel permeation chromatography using polycarbonate standards; and
wherein a demolding force to remove the molded composition from a mold having a draft angle of 0.1 degrees to 7 degrees is less than a demolding force to remove a molded comparative composition that does not comprise the melt flow volume rate, Fries number, and/or molecular weights of the first and second polycarbonate of the composition.

\* \* \* \* \*